United States Patent [19]

Mez

[11] Patent Number: 4,649,645

[45] Date of Patent: Mar. 17, 1987

[54] ORANGE PEELER

[76] Inventor: Georg Mez, Silberdistelweg 68, 7410 Reutlingen-Gonningen, Fed. Rep. of Germany

[21] Appl. No.: 646,742

[22] Filed: Sep. 4, 1984

[51] Int. Cl.$^4$ ............................................. B26B 11/00
[52] U.S. Cl. ....................................... 30/123.7; 30/299
[58] Field of Search .................... 30/299, 120.1, 123.5, 30/123.7, 113.3, 324, 149

[56] References Cited

U.S. PATENT DOCUMENTS

| | | | |
|---|---|---|---|
| 1,231,913 | 7/1917 | Kosin | 30/123.7 X |
| 1,472,462 | 10/1923 | De Port | 30/123.7 |
| 2,328,071 | 10/1930 | Morishita et al. | 30/123.7 |
| 2,692,428 | 10/1954 | Morishita | 30/123.7 |

FOREIGN PATENT DOCUMENTS

| | | | |
|---|---|---|---|
| 847188 | 8/1952 | Fed. Rep. of Germany | 30/123.5 |
| 1255669 | 12/1971 | United Kingdom | 30/123.7 |

Primary Examiner—Douglas D. Watts

[57] ABSTRACT

The orange peeler, on the one hand, permits a cutting motion in a direction that corresponds with the natural sequence of movements of the body while the fruit is peeled and when the skin has to be separated. For this purpose, the handle section is shaped in such a manner that it can conveniently be held in that its top surface and its under surface each have essentially one groove. The handle section changes over into a first end portion which has been shaped into an essentially circular shield. Centric to the shield there is arranged a shaped protrusion which has longitudinally the profile of a ship's hull, so that cutting edges are created which are oriented diagonally to the longitudinal extent of the orange peeler. At its second end portion there is arranged a peeling blade which ends in a quarter circle to round-off the blade. The cutting edge of the blade has wave-like notches to facilitate the lifting of the peel and the fluffy white skin that is located between the skin and the meat of the orange.

16 Claims, 6 Drawing Figures

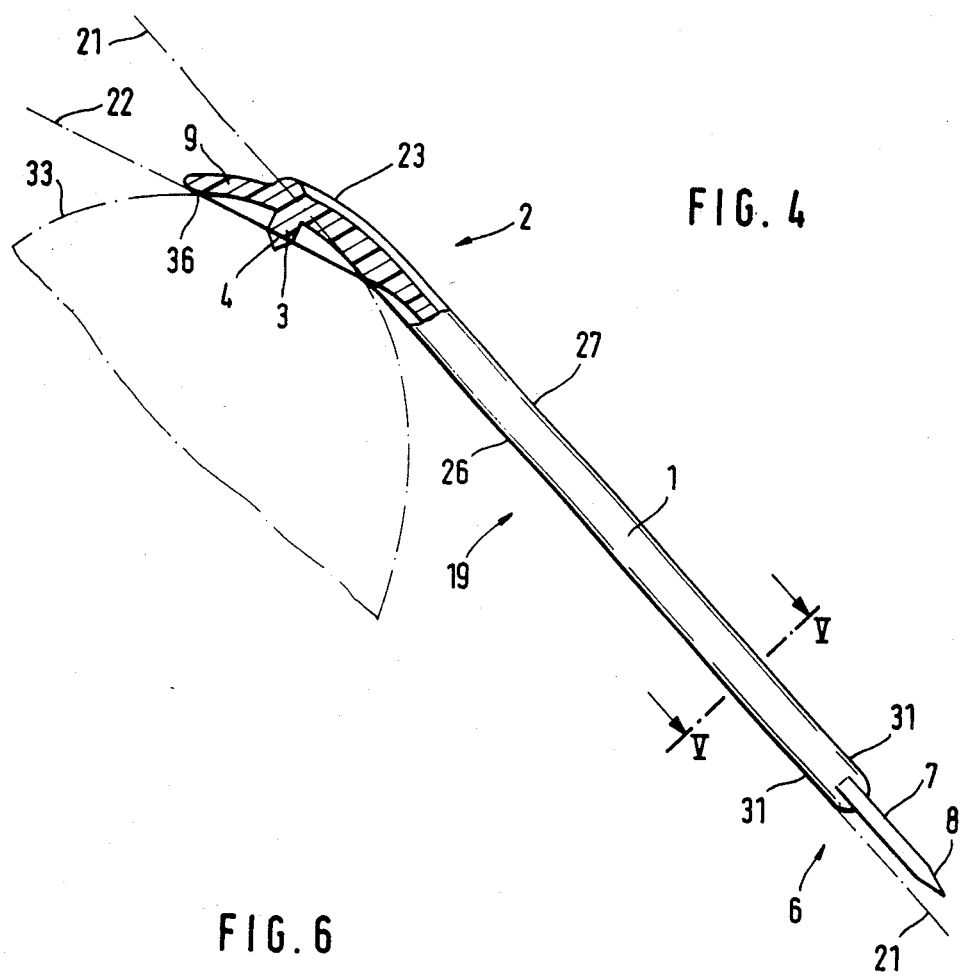
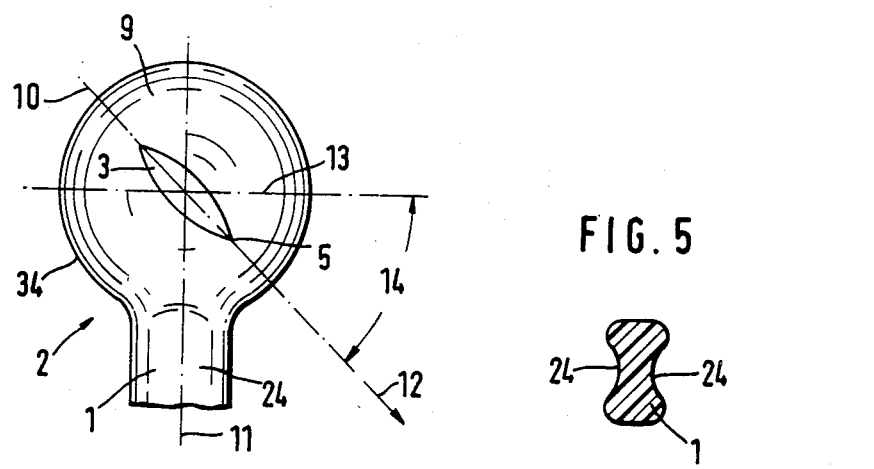

ORANGE PEELER

The invention relates to a one-piece orange peeler consisting of a handle section and a first end portion which changes over into a shaped protrution to create a contact surface that will rest on the surface of the orange prior to the start of the cutting motion and which runs in its longitudinal extent in cutting direction and creates a cutting edge which, in cutting direction, is pointed, and of a second end portion comprising a peeling blade which has been created by tapering off the cross section of the handle section.

BACKGROUND OF THE INVENTION

Such an orange peeler serves to nick the surface of oranges, apples or the like soft-skinned fruits, and to split open the skin and to lift off the peel from the meat of the fruit.

In accordance with prior art, the nicking and splitting open of the orange skin is done by means of a wedge-shaped member arranged at a first end of a handle section.

The shaped member comprises on the one hand a surface area which must at the beginning of the cutting motion be placed against the surface of the orange. There is arranged vertically to the contact surface a cutting edge in form of a wedge, the acumination of which pointing in cutting direction. The opposite end portion is by means of continuous tapering of the handle section shaped into an elongated wedge which serves to lift-off the two sections of orange peel which by now have been separated from each other.

The disadvantages of this known orange peeler are as follows:
(a) The orange peeler cannot be handled conveniently. It does not fit securely in ones hand. The gripping groove provided is not effective.
(b) When the orange peeler is placed against the fruit and the wedge is pressed into the skin, the person using the peeler does not get the impression that he is handling the peeler in a correct manner. He has to look at what he is doing, without however really having any influence or control over the peeler to prevent it from slipping out of the peel.
(c) The thickness and softness of the skins of the above mentioned fruits can vary from fruit to fruit. Since the person using the peeler has no real control over the depth of penetration of the wedge, the orange peeler can penetrate the meat of the fruit.
(d) The juices that are set free when the skin of the fruit is penetrated and when the peel is separated and the meat of the fruit is pierced, will spatter about, messing up the immediate surrounding of the fruit.
(e) The cutting is mainly carried out by moving the upper arm at the shoulder joint and past the front of the body of the person using the peeler. This sequence of awkward movements leads to the above-mentioned unintended slipping-off.
(f) The process of lifting the peel by means of the peeling blade is more a process of pushing than one of peeling. The removal of the fluffy white skin from the meat of the fruit, and the removal of the white fibre particles adhering to the orange, by means of the more or less spatula-like end portion of the orange peeler is unsatisfactory.
(g) When the orange peeler has to be washed there exists always the possibility that it falls out of the basket of the dishwasher, due to its little weight and small size.

OBJECTS AND STATEMENT OF THE INVENTION

It is therefore the aim of the invention to produce an orange peeler of the type mentioned at the beginning, that does not have these disadvantages and that is easy to handle and that makes it possible to perform the cutting movement required to separate the skin, against the body, but in a cutting motion and direction that is in line with a natural sequence of body movements.

In accordance with the invention, this problem is solved in that the handle section in its first end portion is widened to resemble a spoon-like shield, and in that the shaped protrution emerges from this shield and in that it emerges essentially centrically from the shield, whereby a center axis which is created by the longitudinal extent of the shaped protrusion in relation to a longitudinal axis created by the handle section has an inclination of from 0° to about 75°, running vertically through the center vertical line, approximately through the center point of the shield.

Thus, the juices that are set free when the shaped protrusion pierces the skin and when the peel is separated, are on the one hand restricted to the fruit and to the orange peeler, and on the other hand, the protrusion can penetrate the skin only up to a depth which corresponds to its height. The user is able to select an orange peeler that suites the movement of his hand.

Advantageously, the invention has the following additional features.

The longitudinal axis of the protrusion is oriented at an angle in the range of about 0° to 60° to the center axis of said shield. This arrangement will suit the usual direction of movements assumed in a peeling process.

The contact surface on said protrusion is concave. The concave shape of the contact surface in accordance with this arrangement results on the one hand in a secure fitting position of the surface of the fruit, and on the other hand, together with the cutting edge, it produces a point which facilitates the nicking of the surface of the skin.

The longitudinal axis of said protrusion is oriented parallel to the center axis of the shield and said protrusion has two cutting edges having acuminations pointing in opposite directions. These features permit the use of the orange peeler by left-handed persons.

The shield is concave. This construction of the orange peeler permits a snug fitting at the orange during the separation of the peel, whereby it is not required that the shield rests with its entire concave surface on the orange.

The shield has an outer edge that is rounded off, at least on the side that faces the orange. The rounding-off of the shield along its outer edge in accordance with these features and its angled shape in relation to the plane of the handle section in accordance with the following feature improves a convenient handling: The shield extends at an angle to said handle section. The handle has a plane and shield extends at an angle to said plane. The outer measurements of the shield are larger than the length of the protrusion.

Due to the fact that the outer dimensions of the shield are larger than the length of the protrusion, one cannot see the cutting line, but the optimal construction of the shaped protrusion and the shield make such a requirement obsolete so that by means of these measures taken a splattering of the fruit juices is reduced to an even higher degree.

The side of said shield facing away from the orange, said handle section extends at least to the center of the shield, and where appropriate, beyond the center of the shield. The development of the orange peeler in accordance with these features serves not only to improve its stability but enhances also its design.

The handle section is flat, with a top surface and an under surface each of which is provided with a gripping groove. These features improve the grip.

The peeling blade of the second end portion is constructed like a knife. This feature makes it possible to lift off the fluffy skin as well as to remove the finely dispersed fibre particles adhering to the meat of the fruit.

The peeling blade is provided with wave-like notches at least along part of its length. The wave-like cut of the cutting edge in accordance with this feature improves the scraping effectiveness of the blade.

The peeling blade has a front section in the form of a quarter circle. The peeling blade is centered in relation to the handle section and is provided with wave-like notches on the front portion thereof, and the handle section extends into the area of the notches. These features further improve the appearance of the design and the stability of the peeler.

DESCRIPTION OF THE DRAWINGS

The invention is now described by means of drawings of various examples:

FIG. 4 shows a further embodiment of an orange peeler in one of its working positions.

FIG. 5 is a sectional cut through the handle section of the orange peeler along line V—V of FIG. 4, and FIG. 6 shows still another possible embodiment of the first end portion of the orange peeler.

Figure 3:
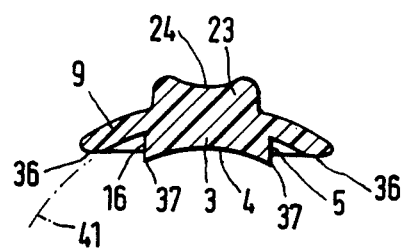
FIG. 3 is a sectional view along line III—III of FIG. 1.

The handle section (1) of the orange peeler could have a rectangular cross-section, as shown in FIG. 5, whereby its edges are strongly rounded-off. Number 24 indicates the gripping grooves which run along both sides of the handle section in longitudinal direction and essentially over its entire length. In the upper first end portion (2) shown here, the handle section changes over into a spoon-like widening. In its centre there is a shaped protrution (3) comprising a contact surface (4) and two cutting edges (5) and (16). The contact surface (4) is concave, as shown in particular in FIG. 3, thus forming together with the cutting edges (5) and (16) two protruding points (37). The protrution (3) is characterized firstly by its centre axis (10) which is here congruent with the center vertical line (13) which, in turn, runs vertical to the longitudinal axis (11) of the orange peeler. Numbers 12 and 17 indicate two opposite cutting directions which are also the working directions of the cutting edges (5) and (16). At its second end portion, the orange peeler comprises a peeling blade (8) which is formed by tapering (7), which on the one hand by means of widening at (38) been brought into a workable width, and on the other hand changes into a quarter circle (29). At least for one part of its length, the blade is provided with wave-like notches (28), ending in a point (39). The outer edge (34) of the shield (9) is rounded-off, as indicated in particular in FIG. 4 by reference number (36). The shield (9) is likewise concave with respect to its working surface, as can be seen in particular in FIG. 3 at (41). The handle section (1) is extended up to the middle of the shield (9), and if necessary, beyond the middle, (at 23), and extends also into its extension (31) at the second end portion (6) of the orange peeler up into the forward portion of the peeling blade (8) which is provided with notches. There is a bore hole provided (32) in this extended section (31) so that it can be hung.

Recognizable in particular is the inclined position (22) of the shield (9) in relation to the plane (21) of the handle section (1). The dotted line (33) indicates at least that portion of an orange against which the orange peeler will be placed when it is in cutting position. To show the function even clearer, the top view is indicated with 26 and the underside with (27).

From this drawing it can also be recognized how the shaped protrution (3) arises from the plane of the shield (9). For a better view, the first end portion (2) is shown in a sectional view.

In FIG. 6 an end portion is shown using the same reference numbers, showing a shaped protrution (3) whose center axis (10) meets the center vertical line (13) vertically, at an angle of approximately 60°, as indicated at (14). Number (12) indicates here the preferred cutting direction with the cutting edge (5) pointing in the same direction.

In the figures, the orange peeler is depicted in approximately its original size, whereby the length of the handle section can be held by four fingers of one hand, while the thumb is resting against the orange. The cross section of the handle section has, with regards to its height and width, been adapted to follow ergonomical requirements set by the joint sections of the fingers so that the finger tips can grip into the grooves (24) of the top surface (26) during the peeling action. The handle section is well rounded-off where the handle section changes over into the shield (9) and into the blade. The blade is arranged essentially centric to the thickness of the handle section, and here too it has been assumed that the fingers of one hand hold the handle during the peeling process. Therefore, when the second end portion (6) of the orange peeler is used, the thumb will rest against the orange.

Figure 1:
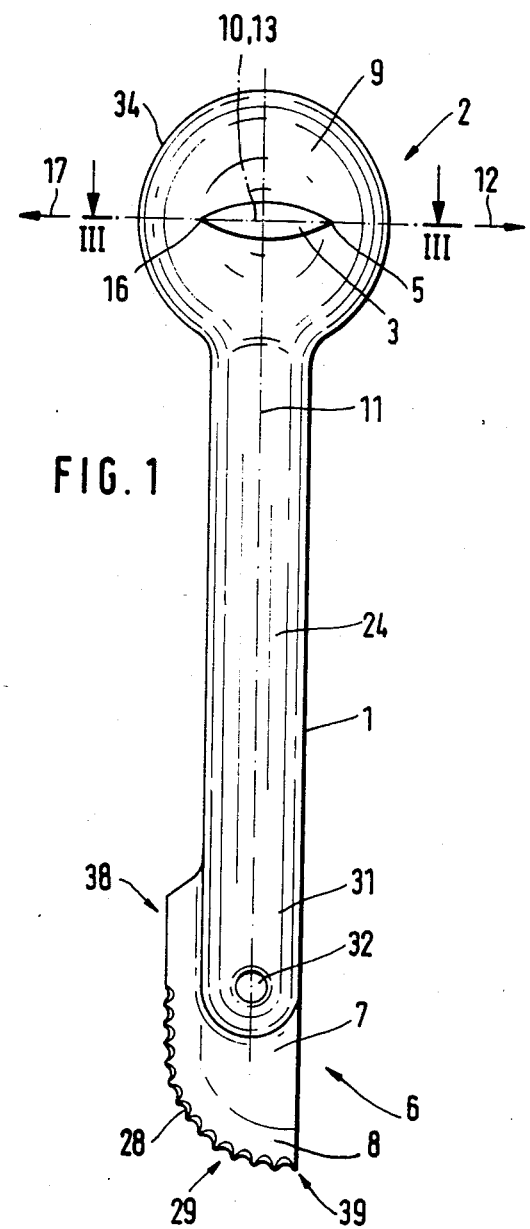
FIG. 1 is a top view onto an orange peeler in accordance with the invention.
Figure 2:
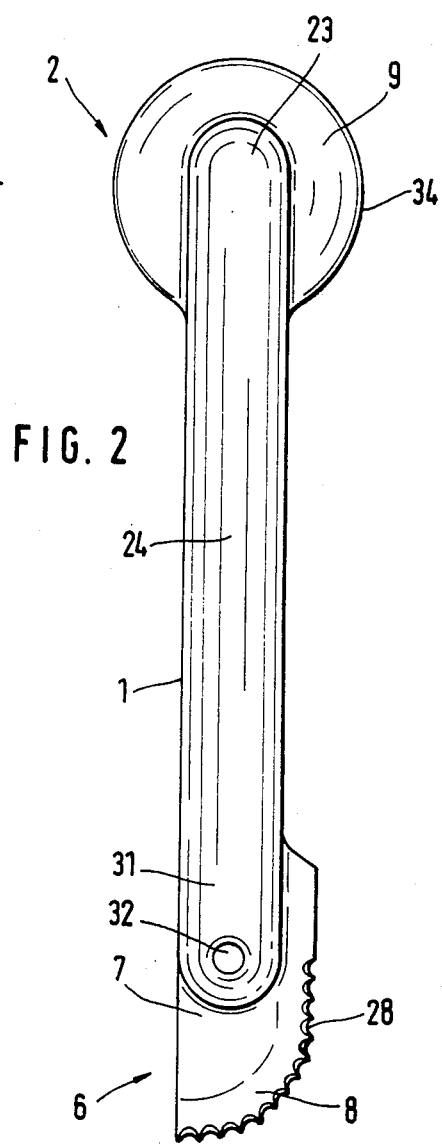
FIG. 2 shows the underside of the orange peeler in accordance with FIG. 1.

The ratio of size between shield (9) and shaped protrution (3) can be recognized in particular in FIG. 1 and FIG. 6. In contrast to its depiction in FIG. 1, the shaped protrution (3) in FIG. 6 points, with its center axis (10) into a direction (12) which permits a pulling movement of the underarm towards the body while cutting, rather than requiring a twisting of the wrist in order to turn the orange peeler.

What is claimed is:
1. An orange peeler comprising:
   a handle section,
   a first end portion on said handle section that transitions into a protrusion having a contact surface that is placed on the orange prior to cutting,
   said protrusion extending longitudinally in the cutting direction and being pointed in the cutting direction to form a cutting edge,
   a second portion on said handle section opposite said first end portion,
   said second end portion comprising a peeling blade formed by a tapering off from the cross section of said handle section, and the improvement wherein:

said first end portion comprises a spoon shaped shield, said protrusion emerges essentially centrally from said shield, said handle section has a longitudinal axis and said longitudinal axis of said protrusion is oriented at an angle of about 90° to said longitudinal axis of said handle section.

2. An orange peeler in accordance with claim 1, wherein said contact surface on said protrusion is concave.

3. An orange peeler in accordance with claim 1, wherein said shield has a center axis that runs vertically to said longitudinal axis of said handle and said longitudinal axis of said protrusion is oriented parallel to said center axis of said shield and said protrusion has two cutting edges having acuminations pointing in opposite directions.

4. An orange peeler in accordance with claim 3, wherein said longitudinal axis is congruent with said center axis.

5. An orange peeler in accordance with claim 1, wherein said shield is concave.

6. An orange peeler in accordance with claim 1, wherein said shield has an outer edge that is rounded off, at least on the side that faces the orange.

7. An orange peeler in accordance with claim 1, wherein said shield extends at an angle to said handle section.

8. An orange peeler in accordance with claim 1, wherein said handle has a plane and shield extends at an angle to said plane.

9. An orange peeler in accordance with claim 1, wherein the outer measurements of said shield are larger than the length of said protrusion.

10. An orange peeler in accordance with claim 1, wherein on the side of said shield facing away from the orange, said handle section extends at least to the center of said shield.

11. An orange peeler in accordance with claim 1, wherein said handle section extends beyond said center of said shield.

12. An orange peeler in accordance with claim 1, wherein said handle section is flat, with a top surface and an under surface each of which is provided with a gripping groove.

13. An orange peeler in accordance with claim 1, wherein said peeling blade of said second end portion is constructed like a knife.

14. An orange peeler in accordance with claim 1, wherein said peeling blade is provided with wave-like notches at least along part of its length.

15. An orange peeler in accordance with claim 1 wherein said peeling blade has a front section in the form of a quarter circle.

16. An orange peeler in accordance with claim 1, wherein said peeling blade is centered in relation to said handle section and is provided with wave-like notches on the front portion thereof, and said handle section extends into the area of said notches.

* * * * *